(12) United States Patent
Deri et al.

(10) Patent No.: US 6,493,484 B1
(45) Date of Patent: Dec. 10, 2002

(54) OPTICAL ADD/DROP FILTER FOR WAVELENGTH DIVISION MULTIPLEXED SYSTEMS

(75) Inventors: Robert J. Deri, Pleasanton, CA (US); Oliver T. Strand, Castro Valley, CA (US); Henry E. Garrett, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/281,742

(22) Filed: Mar. 30, 1999

(51) Int. Cl.[7] .............................. G02B 6/26; G02B 6/42
(52) U.S. Cl. ........................................... 385/27; 385/47
(58) Field of Search ..................... 385/27, 47; 359/580, 359/589, 240

(56) References Cited

U.S. PATENT DOCUMENTS

| | | | |
|---|---|---|---|
| 4,900,118 A | * 2/1990 | Yanagawa et al. | 350/96.15 |
| 5,726,805 A | * 3/1998 | Kaushik et al. | 359/589 |
| 5,859,717 A | * 1/1999 | Scobey et al. | 359/124 |
| 6,115,401 A | * 9/2000 | Scobey et al. | 372/100 |
| 6,157,760 A | * 12/2000 | Fujita et al. | 385/49 |
| 6,167,175 A | * 12/2000 | Zheng et al. | 385/47 |
| 6,208,783 B1 | * 3/2001 | Wach | 385/43 |
| 6,246,818 B1 | * 6/2001 | Fukushima | 385/47 |
| 6,415,082 B1 | * 7/2002 | Wach | 385/39 |

* cited by examiner

Primary Examiner—F. L. Evans
Assistant Examiner—Layla Lauchman
(74) Attorney, Agent, or Firm—Michael C. Staggs; Alan H. Thompson; Lloyd E. Dekin, Jr.

(57) ABSTRACT

An optical add/drop filter for wavelength division multiplexed systems and construction methods are disclosed. The add/drop filter includes a first ferrule having a first preformed opening for receiving a first optical fiber; an interference filter oriented to pass a first set of wavelengths along the first optical fiber and reflect a second set of wavelengths; and, a second ferrule having a second pre-formed opening for receiving the second optical fiber, and the reflected second set of wavelengths. A method for constructing the optical add/drop filter consists of the steps of forming a first set of openings in a first ferrule; inserting a first set of optical fibers into the first set of openings; forming a first set of guide pin openings in the first ferrule; dividing the first ferrule into a first ferrule portion and a second ferrule portion; forming an interference filter on the first ferrule portion; inserting guide pins through the first set of guide pin openings in the first ferrule portion and second ferrule portion to passively align the first set of optical fibers; removing material such that light reflected from the interference filter from the first set of optical fibers is accessible; forming a second set of openings in a second ferrule; inserting a second set of optical fibers into the second set of openings; and positioning the second ferrule with respect to the first ferrule such that the second set of optical fibers receive the light reflected from the interference filter.

28 Claims, 6 Drawing Sheets

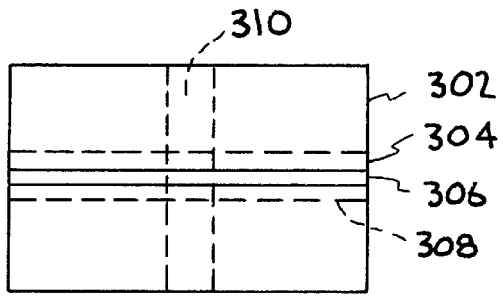
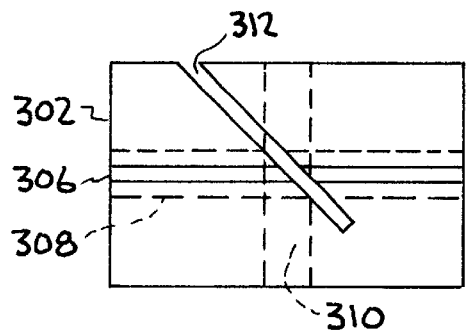
FIG. 3AFIG. 3B
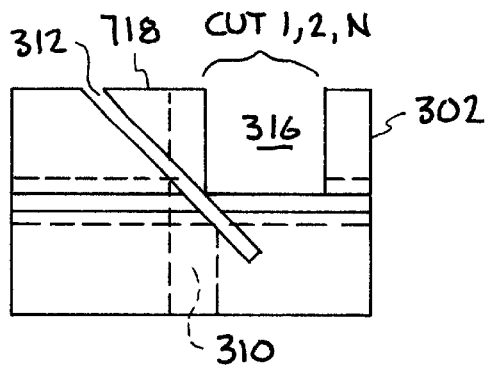
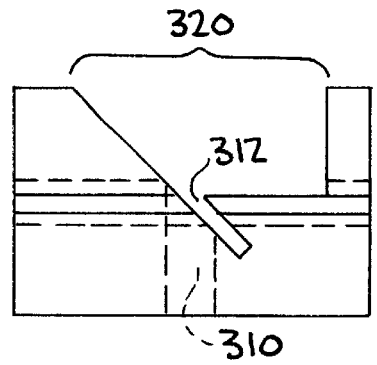
FIG. 3CFIG. 3D
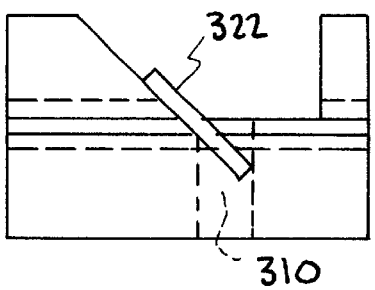
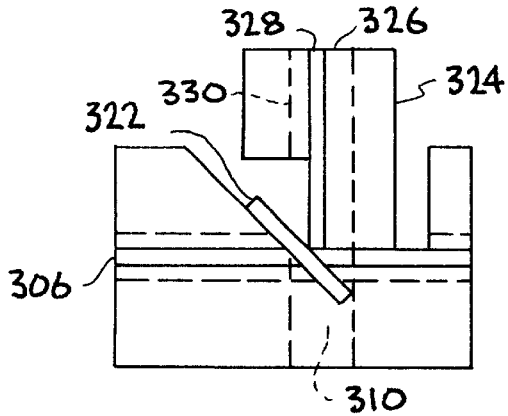
FIG. 3EFIG. 3F

OPTICAL ADD/DROP FILTER FOR WAVELENGTH DIVISION MULTIPLEXED SYSTEMS

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates generally to apparatus and methods for use in wavelength division multiplexed systems, and more particularly to the design and fabrication of optical add/drop filters for wavelength division multiplexed systems.

2. Discussion of Background Art

Fiber optic systems are used to transmit information for high performance communications systems and to interrogate sensors for a variety of applications, including monitoring chemicals and monitoring biomedical parameters. Generally, most such applications benefit from the ability to transmit multiple wavelengths down a single fiber optic cable for wavelength division multiplexed (WDM) systems. The amount of information transmitted down a single fiber is limited by technology and cost constraints on the transceiver units installed on the cable ends (the units that convert between electronic and optical signals). More wavelengths allow more information or more sensor discrimination, without the need for increasing the number of fiber cables. Avoiding an increase in cabling is advantageous because it keeps the cable connection size down (important for minimizing sensor size and for reducing space occupied by connectors on communications boards/cards), and because in some applications (notably network applications) it avoids the need to install more cable to an existing infrastructure, which in general is very expensive. Also, for high performance computer interconnects, the ability to transmit multiple wavelengths enables the destination of an in formation packet to b e simply encoded by mapping destination onto the optical wavelength. This in turn can enhance the performance of the interconnect significantly (see A. J. DeGroot et al, "High performance parallel processors based on star coupled WDM optical interconnects", Proc. 3d Intl Conf. on Massively Parallel Processing using Optical Interconnects, IEEE Computer Society, Oct. 1996).

For this reason, multi-wavelength filter technology has become very popular in telecommunications systems using SINGLE-MODE optical fiber, and a wide variety of products are currently on the market (eg: Ciena, Di-Con, OCA, etc.). In this environment, single mode fiber is used to enable hi-speed transmission over long distances (10 km and above). It's use, however, substantially increases the cost of components (transceivers, wavelength filters) because it has a small optical spot size which results in very stringent alignment tolerances on the components. Single-mode ("monomode") fibers are also not attractive due to the high component cost of single-mode optical components, and lens approaches are less attractive because they add piece parts (cost) and bulk, leading to exceedingly bulky arrays.

For many other applications, however, it is preferable to use MULTI-MODE optical fiber, which has a spot size about 10× larger than single mode fiber. This reduces component cost substantially (but limits transmission distance to about a kilometer at 1 Gbit/sec bandwidth). For these lower-cost systems, component cost is an important consideration, and it is important to achieve a low cost for the wavelength multiplexer. Single mode demultiplexers typically cost $1000/wavelength/fiber end, which is prohibitive. These components also will not work within a multimode system due to incompatibilities between single- and multi-mode fiber.

Parallel optical interconnects over multimode fiber (MMF) ribbon cable are emerging as a robust, high-performance data link technology (See, Y. -M. Wong et al., J. Lightwave Technol. LT-13, 995 (1995); M. Lebby et al., Proc. 1996 Electron. Components & Technol. Conf., p. 279 (1996); and, K. S. Giboney, Proc. SPIE Optoelectron. and Packaging IV (Feb. 1997)). This technology has primarily been implemented as single wavelength, point-to-point links, and can be significantly enhanced by wavelength division multiplexing (WDM) to increase both point-to-point bandwidth as well as create more complex interconnect topologies and routing approaches. The combination of byte-wide transmission for high channel bandwidth with WDM for interconnect routing is particularly attractive for ultrascale computing platforms (See, R.J. Deri et al., Proc. 3d Massively Parallel Proc. using Opt. Interconn., p. 62 (1996)). Research in this area suggests that WDM transceivers for point-to-point links can be realized (See, S. Y. Hu et al., in Proc. 1997 IEEE LEOS Annual Mtng., paper TuJ4 (1997); and, C. Chang-Hasnain, in Proc. 1997 IEEE LEOS Annual Mtng., paper WJ1 (1997)). Exploiting the potential richness of WDM networks, however, also requires a low-loss routing fabric which includes small footprint add/drop multiplexers. Low insertion loss is also critical for this technology because the transceivers exhibit link power budgets well below that of telecom WDM systems and because the multimode fiber cabling precludes the use of optical amplifiers. While high-performance filters can be realized for single-fiber applications (See, L. Aronson et al., presented at OFC '97 ), achieving high-performance devices with ribbon cable is significantly more complicated. Complications arise from the MMF's high NA=0.275 and large core (62.5 $\mu$m), which render array collimation difficult, and the difficulty of maintaining good filter performance at the high angles of incidence needed to minimize loss in a 3-port (2-output) device.

In response to the concerns discussed above, what is needed is a design and fabrication method for optical add/drop filters in wavelength division multiplexed systems that overcomes the problems of the prior art.

SUMMARY OF THE INVENTION

The present invention is an optical add/drop filter for wavelength division multiplexed systems and methods for constructing same. The add/drop filter consists of a first ferrule having a first pre-formed opening for receiving a first optical fiber; an interference filter oriented to pass a first set of wavelengths along the first optical fiber and reflect a second set of wavelengths; and, a second ferrule having a second pre-formed opening for receiving the second optical fiber, and the reflected second set of wavelengths.

A first method for constructing the optical add/drop filter consists of the steps of forming a first set of openings in a first ferrule; forming a first set of guide pin openings in the first ferrule; inserting a first set of optical fibers into the first set of openings; dividing the first ferrule into a first ferrule portion and a second ferrule portion; forming an interference filter on the first ferrule portion; inserting guide pins through the first set of guide pin openings in the first ferrule portion and second ferrule portion to passively align the first set of optical fibers; attaching the second ferrule portion to the interference filter; removing material from the ferrule portions and interference filter such that light reflected from the interference filter from the first set of optical fibers is accessible; forming a second set of openings in a second ferrule; inserting a second set of optical fibers into the second set of openings; and positioning the second ferrule with respect to the first ferrule such that the second set of optical fibers receive the light reflected from the interference filter.

A second method for constructing the optical add/drop filter consists of the steps of forming a first set of openings in a first ferrule; inserting a first set of optical fibers into the first set of openings; cutting a slot into the first ferrule; removing predetermined portions of the ferrules and interference filter; inserting an interference filter into the slot such that light reflected from the interference filter from the first set of optical fibers is accessible; forming a second set of openings in a second ferrule; inserting a second set of optical fibers into the second set of openings; and positioning the second ferrule with respect to the first ferrule such that the second set of optical fibers receive the light reflected from the interference filter.

A third method for constructing the optical add/drop filter consists of the steps of forming guide pin openings in a first block; forming sets of openings in a first, second, and third ferrule; inserting sets of optical fibers into the sets of openings; forming guide pin openings in the first, second, and third ferrules; inserting guide pins through guide pin opening in the first block, and the first and second ferrules such that a first set of light wavelengths from the optical fibers in the first ferrule are passed into the optical fibers of the second ferrule; and inserting guide pins through guide pin opening in the first block, and the third ferrule such that a second set of light wavelengths from the optical fibers in the first ferrule are passed into the optical fibers of the third ferrule.

The apparatus and method of the present invention are particularly advantageous over the prior art because a means for realizing a low-cost wavelength multiplexer for an array of multimode optical fibers is taught. The array is useful because it can mate directly to high-performance transceivers designed to achieve high bandwidth by transmitting simultaneously over several multimode fibers within a multimode optical parallel optical interconnect (POI) fiber array. Alternatively, the array can be cut into individual elements after assembly, thereby providing a batch processing for single-fiber cables. Additionally, the present invention uses fiber ferrules with holes to contain optical fibers instead of surface-machined grooves or channels. This saves cost by reducing fiber-to-block mounting costs, avoids need of adding cover mounts to the fiber blocks, and enables use of injection molding for inexpensive block manufacture and ready adaptation to guide pins.

As a result, this invention demonstrates a simple fabrication approach for compact, high-performance WDM filters which are compatible with existing byte-wide transceivers. The filters are constructed from widely available ferrules to minimize alignment and connectorization costs, and exhibit low loss, sharp skirts, reasonable crosstalk suppression, and a negligible mode selective loss. Such a design is suitable for channel separations as small as 15–30 nm, and 5–10nm with some modification. The invention directly enables several WDM interconnects, including chordal rings. More significantly, in combination with recent advances in byte-wide WDM sources, the present invention will enable byte-wide WDM fabrics with appreciable source routing capability and high channel bandwidth.

The present invention is useful within communications systems where each optical wavelength carries different information. This includes multiplexers, demultiplexers, interconnects of computing nodes within a large parallel processing system, and local area networks between such a processing system and user workstations and/or archival storage. The present invention is also useful within interconnects of a high performance "embedded" processing system for mobile platforms. Importantly, the present invention provides a means to enhance the bandwidth of local area networks without having to upgrade cable infrastructure.

These and other aspects of the invention will be recognized by those skilled in the art upon review of the detailed description, drawings, and claims set forth below.

BRIEF DESCRIPTION OF THE DRAWINGS

FIGS. 3A–3G present a second method for constructing the multi-fiber optical add/drop filter.

DETAILED DESCRIPTION OF THE PREFERRED EMBODIMENT

The present invention is a means for realizing a low-cost wavelength multiplexer for an array of multimode optical fibers. An array design is useful because it can mate directly to high-performance transceivers designed to achieve high bandwidth by transmitting simultaneously over several multimode fibers within a multimode optical fiber array, e.g. parallel optical interconnect (POI). Alternatively, the array can be cut into individual elements after assembly, which provides a batch processing for single-fiber cables.

Figure 1A:
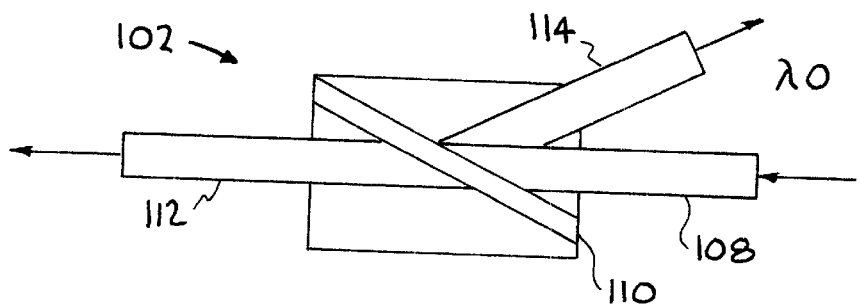
FIGS. 1A–1C present multiple views of a multi-fiber optical add/drop filter constructed according to the present invention.
Figure 1B:
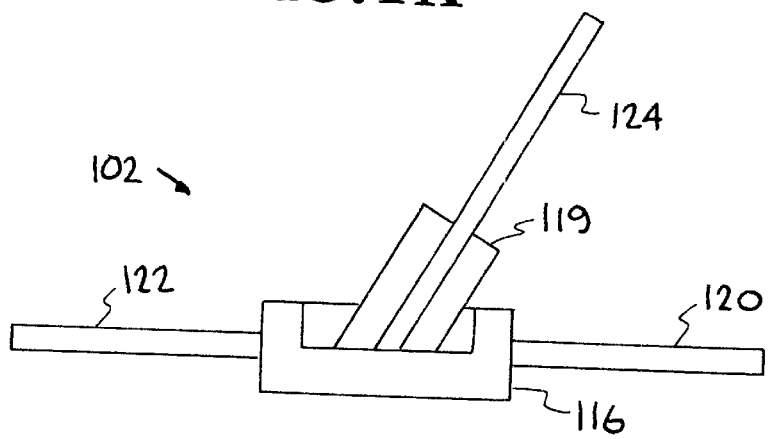
Figure 1C:
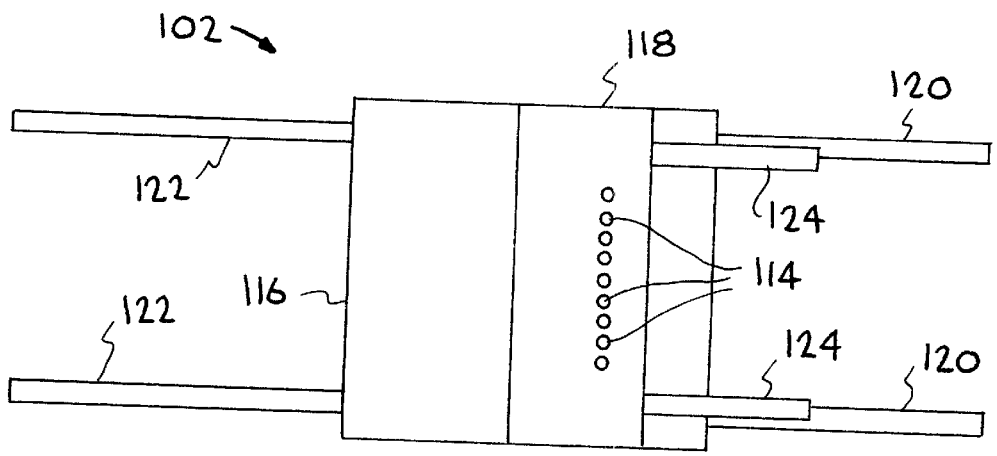

FIG. 1 presents multiple views of a multi-fiber optical add/drop filter 102 constructed according to the present invention. In view A of FIG. 1, a pictorial layout of the add/drop filter is shown to consist of a first set of optical fibers 108, an interference filter 110 which reflects a wavelength lambda-0, a second set of optical fibers 112 carrying all other wavelengths other than lambda-0, and a third set of optical fibers 114 carrying optical wavelength lambda-0. In view B of FIG. 1, a photo of a side view of add/drop filter 102 is shown consisting of a first machined ferrule 116 and a second machined ferrule 118. First ferrule 116 contains a first and second set of guide pins 120 and 122, first set of optical fibers 108, interference filter 110, and second set of optical fibers 112. Second ferrule 118 contains a third set of guide pins 124, and third set of optical fibers 114. The guide pins 120, 122, 124 enable passive optical alignment. Passive alignment means that various filter pieces plug together without a need to actively adjust their relative positions. In view C of FIG. 1, a photo of a top view of add/drop filter 102 is shown. In this view, third set of optical fibers 114 are visible.

The ferrules 116 and 118 are preferably modified POI connectors such as commercially available "MT ferrules." Because the ferrules 116 and 118 are made out of parts that directly mate to various well known standard fiber optic connectors, no additional "connectorization" is required.

Standard fiber optic connectors are commercially available from USConec, of Hickory, N.C. Since connectorization is a major cost contributor to all fiber optic components, this approach significantly reduces the cost. The ferrules 116 and 118 may be injection molded in order to maintain low cost, (See, Satake et al., Proc. 44th Electronic Components and Technology Conference, IEEE Press, pp. 994–999, 1994), or specifically molded into a correct plastic shape. The ferrules 116 and 118 contain a set of circular tube-like openings which receive and align the optical fibers 108, 112, 114.

In contrast to current practices in the art, (See, H. Yanagawa, et al., J. Lightwave Technol. LT-7, p. 1646 (1989)), interference filter 110 illustrated in FIG. 1 is constructed with a high index material designed to minimize bandpass spreading, minimize polarization sensitivity, permit a substantial angle of incidence (preferably 30 degrees), and ease optomechanical packaging. Interference filter 110 may be constructed from compound semiconductor alloys of Groups III–V (AlGaAs, InGaAlAsP, etc.) or Groups II–VI (HgCdZnTeSe). Groups III–V include elements such as gallium, aluminum, indium, arsenic, and phosphorus. These materials have low refractive indices and must operate at a lower angle of incidence, or else the filter bandwidth broadens and insertion loss increases (due to the angular spread of light rays within a multimode fiber). Overall add/drop filter 102 insertion loss depends strongly on diffractive loss during propagation. Small gaps between ferrules 116, 118 and interference filter 110 are required to minimize this loss. This is achievable for second ferrule 118 only under larger angles of incidence. Low-index materials exhibit a passband that is polarization-sensitive at large angles of incidence, which results in inefficient spectral utilization.

Groups II–VI include elements such as mercury, cadmium, zinc, tellurium, sulfur, and selenium. Because these materials have high refractive indices, they enable interference filter 110 to be operated at high angles of incidence and have low sensitivity to the angle of incidence or input polarization. This is important because large angles of incidence reduces filter 110 attenuation due to diffraction for all wavelengths and minimizes back-reflections into optical fibers 108, 112, 114. The resulting high angle/polarization insensitivity also permits use of narrowband filters having a low insertion loss and efficient spectral utilization.

AlGaAs is one high-index filter material which is compatible with a 30° angle of incidence. For example, an interference filter with a broadband 40 nm wide reflection includes thirty-one layers of quarter-wave AlGaAs sandwiched between $TaO_x$ single-layer AR coatings. Other filters with different transmission characteristics can be realized by modifying the AlGaAs layer thicknesses and compositions. The AlGaAs is grown using Molecular Beam Epitaxy (MBE) or Metal-organic chemical vapor deposition techniques on a GaAs substrate. The AlGaAs is then removed by selective etching. While this interference filter 110 is compatible with commercially available byte-wide transceivers having moderate wavelength tolerances, those skilled in the art will recognize other configurations which are useful in other applications. For instance, the high-refractive index material may alternatively be formed of AlInGaAsP or HgCdZnSeTe for use at some other predetermined non-zero angle of incidence which would result in an add/drop filter with narrow bandwidth, low polarization sensitivity and suitability for low diffractive coupling loss.

In an alternate design, the interference filter 110 is replaced with a microlens arrays at an end of each MT ferrule. The microlenses provide additional collimation which allows an even narrower filter bandpass, but is somewhat more costly.

FIG. 2 presents a first method for constructing the multi-fiber optical add/drop filter 102 illustrated in FIG. 1. First, in FIG. 2A, construction begins by selecting ferrule 202 having a first set of pre-formed openings 204 containing a first set of optical fibers 206, and a first set of guide pin openings 208 and a second set of guide pin openings 210. Ferrule 202 is preferably a modified MT ferrule. Pre-formed openings 204 are preferably of a cross-section which matches that of optical fibers 206. Typically, said cross-section is circular. As such, optical fibers 206 may be precisely positioned through insertion within pre-formed openings 204 and cemented in place. Optical fibers 206 can be 62.5 $\mu$m GRIN core Multi-Mode Fibers (MMFs). Ferrule 202 is then cut with a wafer saw into a first ferrule portion 212 and a second ferrule portion 214. Facets 216, 218 on the ferrule portions are cut to thirty degrees.

Figure 2A:
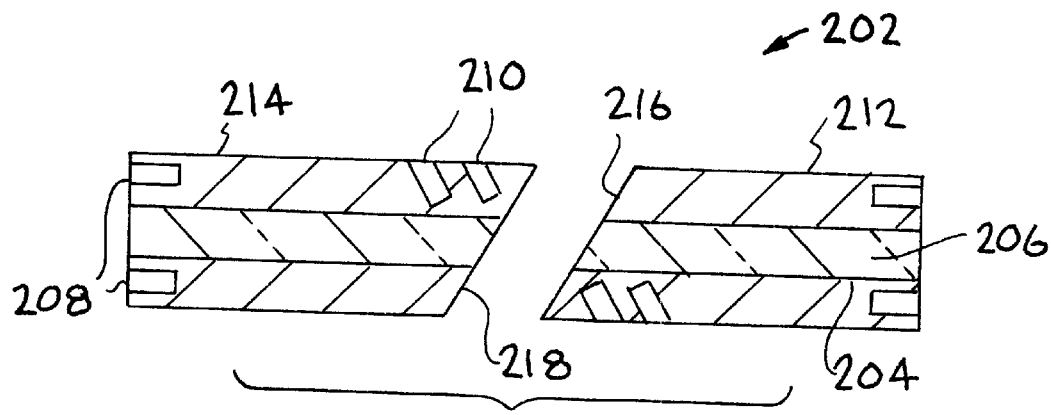
FIGS. 2A–2F present a first method for constructing the multi-fiber optical add/drop filter.
Figure 2B:
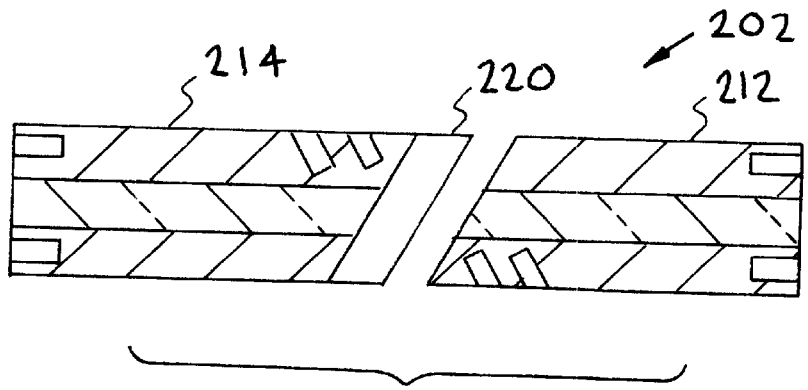

Next, in FIG. 2B, a thin film interference filter 220 is formed on second ferrule portion 214. Low index filters 220 can be formed on second ferrule portion 214 using ion-assisted evaporation, sputtering, or any other thin-film coating process. However, when filter 220 is made from a high index material, a different approach is used. High index filters are epitaxially grown on a semiconductor substrate by either a MBE or MOCVD (i.e., Metal Oxide Chemical Vapor Deposition) process. Filter 220 is then epoxied onto the facet 218 of second ferrule portion 214, and the semiconductor substrate is removed by composition-selective wet chemistry.

Figure 2C:
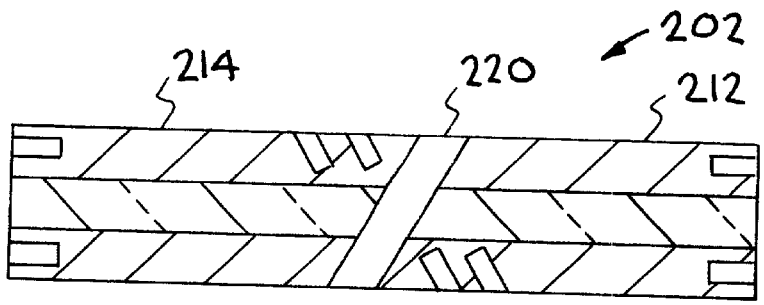

In FIG. 2C, facet 216 of first ferrule portion 212 is then epoxied to interference filter 220 using guide pins (not shown) inserted through first set of guide pin openings 208, which passively aligns optical fibers 206 in first and second ferrule portions 212 and 214.

Figure 2D:
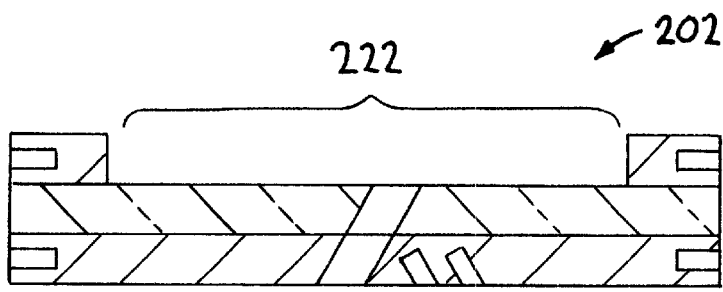

In FIG. 2D, a wafer saw removes an upper part of ferrule 202 and filter 220 to create a notch 222 so that light reflected from filter 220 is accessible. The notch 222 must be of sufficient width so that a portion of the interference filter 220, which reflects wavelength lambda-0 is exposed. Saw cut depth is controlled via microscope inspection during cutting.

Figure 2E:
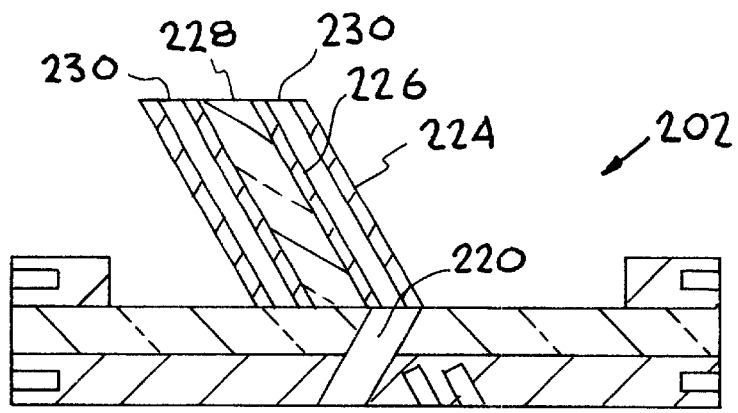

In FIG. 2E, a third ferrule 224, preferably a plastic or ceramic piece, having a second set of pre-formed openings 226, a second set of optical fibers 228, and a third second set of guide pin openings 230 is mounted within notch 222. One end of ferrule 224 is cut at an angle sufficient to receive wavelength lambda-0. Guide pins (not shown) are inserted through second and third set of guide pin openings 210 and 230, which passively aligns second set of optical fibers 228 with interference filter 220 in ferrule 202 so as to receive wavelength lambda-0. This provides angular registration and position registration perpendicular to a three fiber plane. In this procedure, care is required in controlling a depth of notch 222 in ferrule 202 and in longitudinal alignment of ferrule 224 along an axis of ferrule 202. In a first alternate embodiment, the second and third sets of guide pin openings 210 and 230 are eliminated from ferrule 202 and 224 respectively, and ferrule 224 is longitudinally positioned along the axis of ferrule 202 using active alignment techniques. Active alignment is defined as when ferrule 224 must be moved within a plane defined by the first set of optical fibers 206.

Figure 2F:
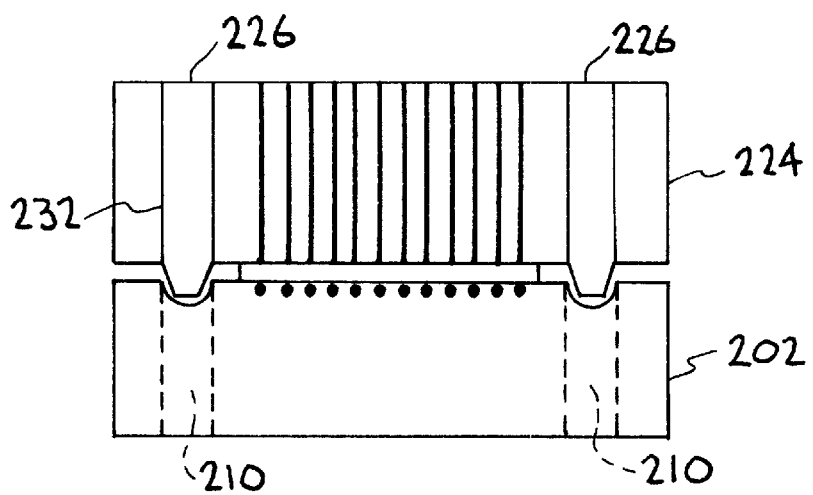

FIG. 2F illustrates a cross sectional view of a second alternate embodiment of FIG. 2E. In this alternate embodiment, second set of guide pin openings 210 are eliminated from ferrule 202. However, guide pins 232 are inserted into third set of guide pin openings 230 to longitudinally position ferrule 224 along the axis of ferrule 202. Thus, guide pins 232 from third set of guide pin openings 230 enable active alignment of ferrule 224 to ferrule 202 by riding within a trough 236 that was created by guide pin openings 208, illustrated in FIG. 2C, exposed by notch 222, illustrated in FIG. 2D, in ferrule 202. Thus, ferrule 224 is actively aligned with ferrule 202 such that wavelength lambda-0 is transmitted by optical fibers 206 and reflected from interference filter 220 into second set of optical fibers 228. In this second embodiment, active alignment is limited to only one dimension.

FIG. 3 presents a second method for constructing multi-fiber optical add/drop filter 102 illustrated in FIG. 1. First, in FIG. 3A, construction begins by selecting ferrule 302 having a first set of pre-formed openings 304 containing a first set of optical fibers 306, and a first set of guide pin openings 308 and a second set of guide pin openings 310. In FIG. 3B, a slot 312 is cut into ferrule 302.

Next, in FIG. 3C, a wafer saw removes material from an upper portion of ferrule 302 until optical fibers 306 and slot 312 are exposed. The wafer saw removes material using a series of right to left cuts 316 (e.g. cut #1, #2 . . . #N), after which an excess portion 318 falls away, resulting in a notch 320 shown in FIG. 3D. An interference filter 322 is then inserted into slot 312 and held in place by an epoxy or equivalents, as shown in FIG. 3E.

FIG. 3F illustrates the introduction of ferrule 324, having a second set of pre-formed openings 326 containing a second set of optical fibers 328, and a third set of guide pin openings 330. Guide pins (not shown in FIG. 3F) are then inserted through third set of guide pin openings 330 in ferrule 324 and second set of guide pin openings 310 in ferrule 302. Thus, ferrules 302 and 324 are passively aligned such that wavelength lambda-0 is reflected out of the first set of optical fibers 306 by interference filter 322 into second set of optical fibers 328.

Figure 3G:
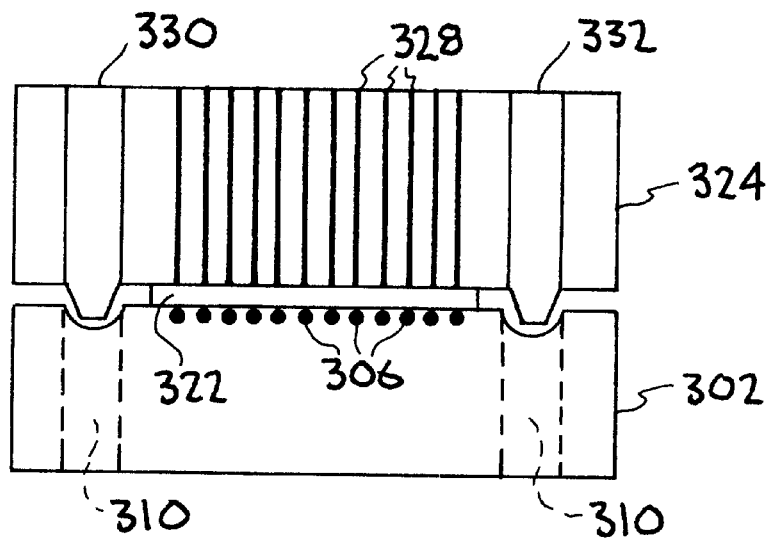

FIG. 3G illustrates a cross sectional view of an alternate embodiment of FIG. 3F. This embodiment illustrates active alignment of ferrule 324 with ferrule 302 such that wavelength lambda-0 is reflected into second set of optical fibers 328 from first set of optical fibers 306 through interference filter 322. In this method, second set of guide pin openings 310 in ferrule 302 may be eliminated and ferrule 324 can be actively aligned as the guide pins 332 ride within a trough 336 created by the exposed first set of guide pin openings 308, illustrated in FIG. 2A, in ferrule 302.

Figure 4A:
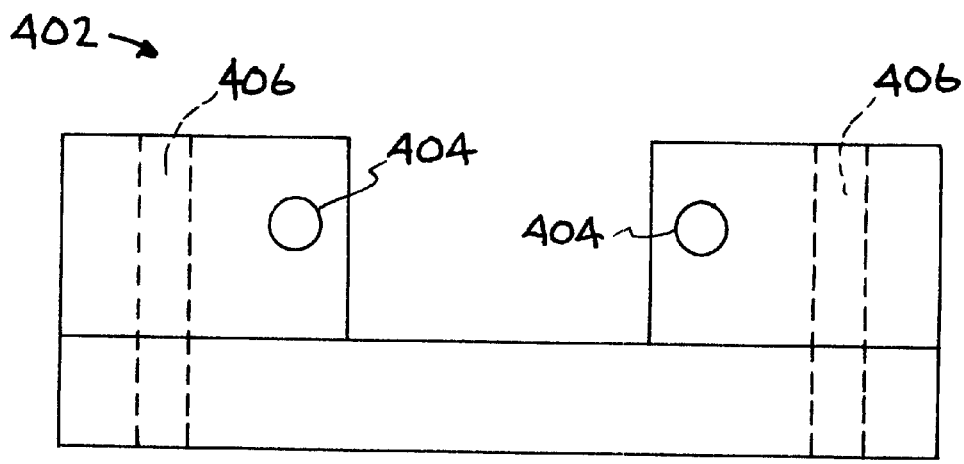
FIGS. 4A–4C present a third method for constructing the multi-fiber optical add/drop filter.
Figure 4:
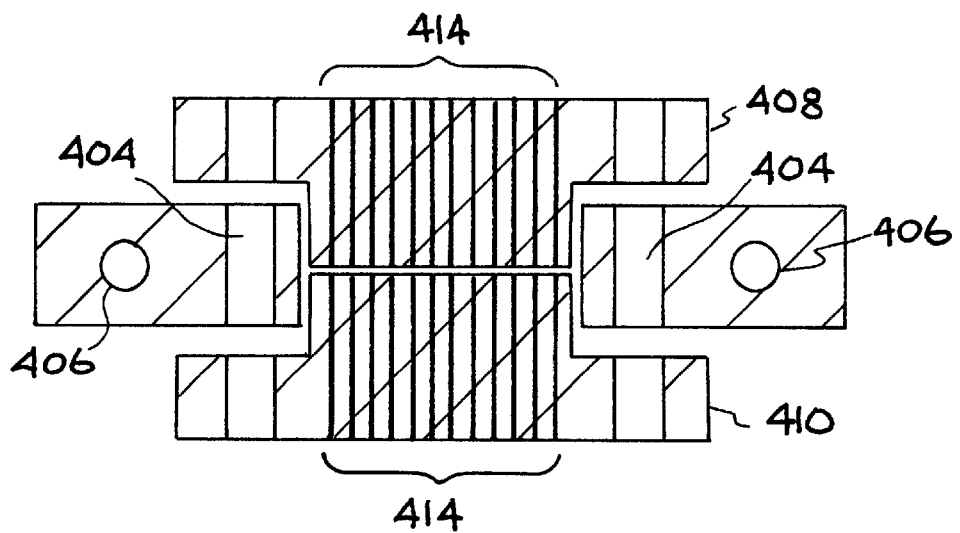
Figure 4:
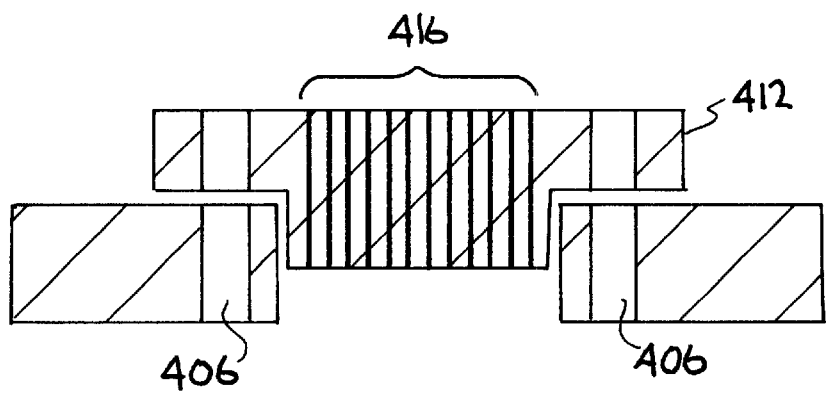

FIG. 4 presents a third method for constructing the multi-fiber optical add/drop filter 102 illustrated in FIG. 1. To begin, FIG. 4A illustrates a side view of a brass block structure 402 having a first and second set of guide pin openings 404 and 406 respectively. Alternatively, brass block 402 may be replaced with an injection molded part. FIG. 4B illustrates a top view wherein a first ferrule 408 and a second ferrule 410 are passively aligned by guide pins inserted through first set of guide pin openings 404. FIG. 4C illustrates a side view wherein a third ferrule 412 is passively aligned by guide pins (not shown) inserted through second set of guide pin openings 406, such that wavelength lambda-0 may be reflected from optical fibers 414 (in FIG. 4B) in ferrules 408 and 410 into optical fibers 416 in ferrule 412.

Each of the three methods for constructing the multi-fiber optical add/drop filter 102 all minimize the need for active filter alignment. Those skilled in the art will recognize that other assembly sequences constituting variations on the three presented are also possible. Add/drop filters 102 fabricated using one of the above methods, have been empirically observed to exhibit steep skirts, low insertion loss and good crosstalk isolation.

While the present invention has been described with reference to a preferred embodiment, those skilled in the art will recognize that various modifications may be made. Variations upon and modifications to the preferred embodiment are provided by the present invention, which is limited only by the following claims.

What is claimed is:

1. An optical add/drop filter comprising:
    a first optical fiber having a substantially circular cross-section;
    a first ferrule having, a first pre-formed opening coupled to receive the first optical fiber wherein said first pre-form opening has a substantially circular cross-section; and an interference filter coupled to pass a first set of wavelengths along the first optical fiber and reflect a second set of wavelengths;
    a second optical fiber having a substantially circular cross-section; and
    a second ferrule having a second pre-formed opening coupled to receive the second optical fiber, and the reflected second set of wavelengths, wherein said second pre-form opening has a substantially circular cross-section.

2. The add/drop filter of claim 1 wherein:
    the optical fibers have an optical cross-section; and
    the pre-formed openings have an opening cross-section commensurate with the optical cross-section.

3. The add/drop filter of claim 1 wherein:
    the first ferrule includes a notch for exposing the reflected second set of wavelengths; and
    the second ferrule is coupled to the notch.

4. The add/drop filter of claim 1 wherein:
    the ferrules include a byte-wide set of optical fibers.

5. The add/drop filter of claim 1 wherein:
    the second ferrule includes a guide pin; and
    the first ferrule includes a groove for constraining movement of the guide pin;
    whereby the ferrules are semi-actively aligned.

6. The add/drop filter of claim 1 wherein:
    the second ferrule includes a guide pin; and
    the first ferrule includes an opening for insertion of the guide pin;
    whereby the ferrules are passively aligned.

7. The add/drop filter of claim 1 wherein:
    the interference filter is formed from a semiconductor alloy high-refractive index material, wherein the alloy includes at least one element from a group consisting of gallium, aluminum, indium, arsenic, and phosphorus.

8. The add/drop filter of claim 1 wherein:
    the interference filter is formed of AlGaAs.

9. The add/drop filter of claim 1 wherein:
    the interference filter is formed of InGaAlAsP.

10. The add/drop filter of claim 1 wherein:
    the interference filter is formed from a semiconductor alloy high-refractive index material, wherein the alloy includes at least one element from a group consisting of mercury, cadmium, zinc, tellurium, sulfur, and selenium.

11. The add/drop filter of claim 1 wherein:
the interference filter is formed of HgCdZnTeSe.

12. A method for constructing an optical add/drop filter, comprising the steps of:
forming a first set of openings in a first ferrule;
inserting a first set of optical fibers into the first set of openings;
forming a first set of guide pin openings in the first ferrule;
dividing the first ferrule into a first ferrule portion and a second ferrule portion;
forming an interference filter on the first ferrule portion;
inserting guide pins through the first set of guide pin openings in the first ferrule portion and second ferrule portion to passively align the first set of optical fibers;
coupling the second ferrule portion to the interference filter;
removing material from the ferrule portions and interference filter such that light reflected from the interference filter from the first set of optical fibers is accessible;
forming a second set of openings in a second ferrule;
inserting a second set of optical fibers into the second set of openings; and
positioning the second ferrule with respect to the first ferrule such that the second set of optical fibers receive the light reflected from the interference filter.

13. The method of claim 12 wherein the steps of forming sets of openings includes the step of:
forming circular sets of openings.

14. The method of claim 12, wherein the step of forming an interference filter includes the step of:
selecting a semiconductor alloy high-refractive index material including at least one element from a group consisting of gallium, aluminum, indium, arsenic, and phosphorus; and
forming the interference filter from the semiconductor alloy high-refractive index material.

15. The method of claim 12 wherein the step of forming an interference filter includes the step of:
selecting a semiconductor alloy high-refractive index material including at least one element from a group consisting of mercury, cadmium, zinc, tellurium, sulfur, and selenium; and
forming the interference filter from the semiconductor alloy high-refractive index material of group II–VI.

16. The method of claim 12 further including the steps of:
forming a second set of guide pin openings in the first ferrule;
forming a third set of guide pin openings in the second ferrule; and
inserting guide pins through the second and third sets of guide pin openings such that the second set of optical fibers receive the light reflected from the interference filter.

17. The method of claim 12 further including the steps of:
exposing the first set of guide pin openings in the first ferrule;
forming a second set of guide pin openings in the second ferrule; and
inserting guide pins through the second set-of guide pin openings into the exposed first set of guide pin openings such that the second set of optical fibers receive the light reflected from the interference filter.

18. A method for constructing an optical add/drop filter, comprising the steps of:
forming a first set of openings in a first ferrule;
inserting a first set of optical fibers into the first set of openings;
cutting a slot into the first ferrule;
removing predetermined portions of the first ferrule such that the slot and the first set of optical fibers are exposed;
inserting an interference filter into the slot such that light reflected from the interference filter from the first set of optical filters is accessible;
forming a second set of openings in a second ferrule;
inserting a second set of optical fibers into the second set of openings; and
positioning the second ferrule with respect to the first ferrule such that the second set of optical fibers receive the light reflected from the interference filter.

19. A method for constructing an optical add/drop filter, comprising the steps of:
forming guide pin openings in a first block;
forming sets of openings in a first, second, and third ferrule;
inserting sets of optical fibers into the sets of openings;
forming guide pin openings in the first, second, and third ferrules;
inserting guide pins through guide pin opening in the first block, and the first and second ferrules such that a first set of light wavelengths from the optical fibers in the first ferrule are passed into the optical fibers of the second ferrule; and
inserting guide pins through guide pin opening in the first block, and the third ferrule such that a second set of light wavelengths from the optical fibers in the first ferrule are passed into the optical fibers of the third ferrule.

20. A system for constructing an optical add/drop filter, comprising:
means for forming a first set of openings in a first ferrule;
means for inserting a first set of optical fibers into the first set of openings;
means for forming a first set of guide pin openings in the first ferrule;
means for dividing the first ferrule into a first ferrule portion and a second ferrule portion;
means for forming an interference filter on the first ferrule portion;
means for inserting guide pins through the first set of guide pin openings in the first ferrule portion and second ferrule portion to passively align the first set of optical fibers;
means for coupling the second ferrule portion to the interference filter;
means for removing material from the ferrule portions and interference filter such that light reflected from the interference filter from the first set of optical fibers is accessible;
means for forming a second set of openings in a second ferrule;
means for inserting a second set of optical fibers into the second set of openings; and
means for positioning the second ferrule with respect to the first ferrule such that the second set of optical fibers receive the light reflected from the interference filter.

21. A method for constructing an optical add/drop filter, comprising the steps of:

means for forming a first set of openings in a first ferrule;

means for inserting a first set of optical fibers into the first set of openings;

means for cutting a slot into the first ferrule;

means for removing predetermined portions of the first ferrule such that the slot and the first set of optical fibers are exposed;

means for inserting an interference filter into the slot such that light reflected from the interference filter from the first set of optical filters is accessible;

means for forming a second set of openings in a second ferrule;

means for inserting a second set of optical fibers into the second set of openings; and means for positioning the second ferrule with respect to the first ferrule such that the second set of optical fibers receive the light reflected from the interference filter.

22. An optical add/drop filter comprising:

a first optical fiber;

a first ferrule having, a first pre-formed opening coupled to receive the first optical fiber; and an interference filter coupled to pass a first set of wavelengths along the first optical fiber and reflect a second set of wavelengths, wherein the interference filter is formed from a semiconductor alloy high-refractive index material, wherein the alloy includes at least one element from a group consisting of gallium, aluminum, indium, arsenic, and phosphorus;

a second optical fiber; and a second ferrule having a second pre-formed opening coupled to receive the second optical fiber, and the reflected second set of wavelengths.

23. An optical add/drop filter comprising:

a first optical fiber;

a first ferrule having, a first pre-formed opening coupled to receive the first optical fiber; and an interference filter coupled to pass a first set of wavelengths along the first optical fiber and reflect a second set of wavelengths, wherein the interference filter is formed of AlGaAs;

a second optical fiber; and a second ferrule having a second pre-formed opening coupled to receive the second optical fiber, and the reflected second set of wavelengths.

24. An optical add/drop filter comprising:

a first optical fiber;

a first ferrule having, a first pre-formed opening coupled to receive the first optical fiber; and an interference filter coupled to pass a first set of wavelengths along the first optical fiber and reflect a second set of wavelengths, wherein the interference filter is formed of InGaAlAsP;

a second optical fiber; and a second ferrule having a second pre-formed opening coupled to receive the second optical fiber, and the reflected second set of wavelengths.

25. An optical add/drop filter comprising:

a first optical fiber;

a first ferrule having, a first pre-formed opening coupled to receive the first optical fiber; and an interference filter coupled to pass a first set of wavelengths along the first optical fiber and reflect a second set of wavelengths, wherein the interference filter is formed from a semiconductor alloy high-refractive index material, wherein the alloy includes at least one element from a group consisting of mercury, cadmium, zinc, tellurium, sulfur, and selenium;

a second optical fiber; and a second ferrule having a second pre-formed opening coupled to receive the second optical fiber, and the reflected second set of wavelengths.

26. An optical add/drop filter comprising:

a first optical fiber;

a first ferrule having, a first pre-formed opening coupled to receive the first optical fiber; and an interference filter coupled to pass a first set of wavelengths along the first optical fiber and reflect a second set of wavelengths, wherein the interference filter is formed of HgCdZnTeSe;

a second optical fiber; and a second ferrule having a second pre-formed opening coupled to receive the second optical fiber, and the reflected second set of wavelengths.

27. A method for constructing an optical add/drop filter, comprising the steps of:

forming a first set of openings in a first ferrule;

inserting a first set of optical fibers into the first set of openings;

forming a first set of guide pin openings in the first ferrule;

dividing the first ferrule into a first ferrule portion and a second ferrule portion;

forming an interference filter on the first ferrule portion by selecting a semiconductor alloy high-refractive index material including at least one element from a group consisting of gallium, aluminum, indium, arsenic, and phosphorus; and forming the interference filter from the semiconductor alloy high-refractive index material;

inserting guide pins through the first set of guide pin openings in the first ferrule portion and second ferrule portion to passively align the first set of optical fibers;

coupling the second ferrule portion to the interference filter;

removing material from the ferrule portions and interference filter such that light reflected from the interference filter from the first set of optical fibers is accessible;

forming a second set of openings in a second ferrule;

inserting a second set of optical fibers into the second set of openings; and positioning the second ferrule with respect to the first ferrule such that the second set of optical fibers receive the light reflected from the interference filter.

28. A method for constructing an optical add/drop filter, comprising the steps of:

forming a first set of openings in a first ferrule;

inserting a first set of optical fibers into the first set of openings;

forming a first set of guide pin openings in the first ferrule;

dividing the first ferrule into a first ferrule portion and a second ferrule portion;

forming an interference filter on the first ferrule portion by selecting a semiconductor alloy high-refractive index material including at least one element from a group consisting of mercury, cadmium, zinc, tellurium, sulfur, and selenium and; forming the interference filter from the semiconductor alloy high-refractive index material of group II–VI;

inserting guide pins through the first set of guide pin openings in the first ferrule portion and second ferrule portion to passively align the first set of optical fibers;

coupling the second ferrule portion to the interference filter;

removing material from the ferrule portions and interference filter such that light reflected from the interference filter from the first set of optical fibers is accessible;

forming a second set of openings in a second ferrule;

inserting a second set of optical fibers into the second set of openings; and positioning the second ferrule with respect to the first ferrule such that the second set of optical fibers receive the light reflected from the interference filter.

* * * * *